(No Model.)
W. P. BUTLER.
VAPOR BURNING LAMP OR STOVE.
No. 323,851.  Patented Aug. 4, 1885.
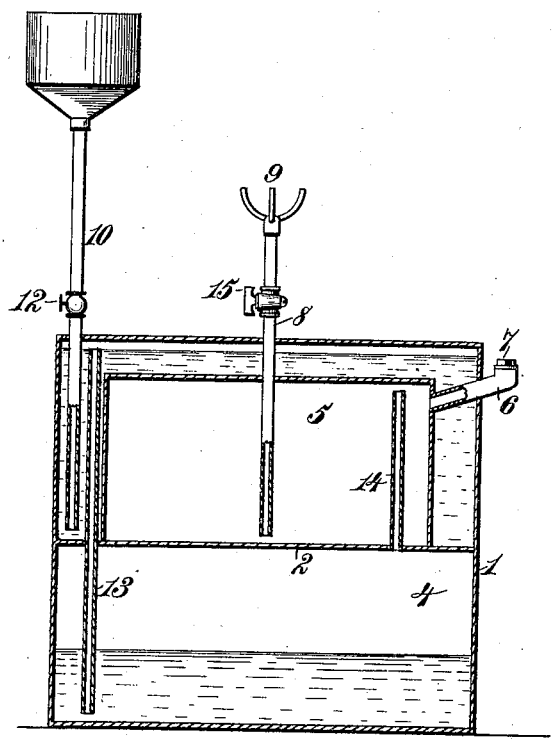
Witnesses.
Robert Everett.
J. A. Rutherford
Inventor.
William P. Butler.
By James L. Norris,
Atty.

UNITED STATES PATENT OFFICE.

WILLIAM P. BUTLER, OF CHICAGO, ILLINOIS.

VAPOR-BURNING LAMP OR STOVE.

SPECIFICATION forming part of Letters Patent No. 323,851, dated August 4, 1885.

Application filed February 5, 1885. (No model.)

*To all whom it may concern:*

Be it known that I, WILLIAM P. BUTLER, a citizen of the United States, residing at Chicago, Illinois, have invented new and useful Improvements in Vapor-Burning Lamps or Stoves, of which the following is a specification.

My invention relates to lamps which may be used either for purposes of illumination or as the heating agent in stores, &c.; and its object is to so construct such lamps that the oil-reservoir shall be thoroughly protected and danger of explosion or accidental combustion reduced to a minimum, or practically obviated.

To this end the invention is an improvement in that class or form of lamps wherein a uniform feed of the fluid to the burner is maintained by an air-pressure on the surface of the fluid in its reservoir, this pressure forcing the fluid to the style of burner used. In such the air-pressure is given by the action of a column or body of water, the top of the column being higher than the fluid-reservoir. This column or body of water is contained in a reservoir connected to an air-compressing chamber, in which the air is compressed by the flow of the water from its reservoir, the air-chamber being connected to the oil-reservoir, so that the pressure of the air is transmitted thereto and acts upon the oil.

Using this well-known form of lamp and its principle of operation for feeding the oil to the burner, my improvement consists in so combining and arranging the necessary parts as to inclose the reservoir for the combustible material within the water-reservoir, the latter entirely surrounding it, thereby keeping it cool, preventing undue vaporization of the inflammable material, and consequently obviating danger of explosion.

The invention may be more readily understood by reference to the following description and claims, and to the drawing, which is a vertical section through the center of an apparatus embodying the invention.

In the said drawing, the reference-numeral 1 denotes a tightly-closed metallic vessel, having a partition, 2, dividing its interior into an upper and a lower chamber, 3 and 4, respectively. In the upper chamber, 3, is placed a vessel, 5, wholly inclosed, and having a spout, 6, which projects through the wall of the outer vessel, 1, and is provided with a screw-cap, 7, through which gasoline is introduced into the vessel 5. A tube, 8, enters the outer vessel, 1, from above, and passes through the top of the inner vessel, 5, extending nearly to the bottom of the latter. A burner, 9, is mounted upon the upper end of this tube. A tube, 10, which extends some distance above the vessel 1, enters the vessel 1, passing through its top near one side. This tube extends down nearly to the partition 2, and has a water-reservoir, 11, upon its upper end, and a valve or cock, 12, between the reservoir and the vessel. An inner pipe, 13, passes through the partition 2, its upper end extending almost to the top of the chamber 3, and its lower end almost to the bottom of the chamber 4. A pipe, 14, also leads from a point just beneath the top of the vessel 5, through the bottom of said vessel, and also extends through but not below the partition 2. The pipe 8, carrying the burner, is provided with a cock or valve, 15, by which the flow of gasoline is cut off at pleasure. The vessel 5 is filled nearly to the top with gasoline, and the cap 7 is tightly closed. The water-reservoir is then filled and the valve 12 is opened, when water will flow through the pipe 10 into the chamber 3, wherein it rises until the vessel 5 is wholly surrounded, the displaced air being driven through the pipe 13, down into the lower chamber, 4, and thence through the pipe 14 into the vessel 5. As the water rises to the end of the pipe 13, it will also flow into the lower chamber, 4; but with the relative sizes and construction of the parts it will never rise in the lower chamber high enough to enter the pipe 14. It will thus be seen that a steady and equable pressure will be exerted on the surface of the gasoline in the vessel 5, and as the burner 9 is below the level of the reservoir 11, the gasoline will at all times be driven fully up to the burner 9, where it will be consumed. The vessel 5 being at the same time wholly surrounded by water or other non-inflammable liquid, all danger of explosion will be avoided. The vessel 1 is of any desired contour or shape, square or round, and the burner 9 may be of any desired kind—for instance, a wick-burner, in which case the pipe 8 is enlarged to burn a wick-tube. It is also to be understood that the term "oil" is used herein as typical of any suitable inflammable material.

If the lamp is to be used in situations where it will be exposed to low temperatures, in lieu of water, a fluid of low congealing-point should be used, so that the pressure agent, the liquid, shall always remain fluid.

What I claim is—

1. In a lamp, the combination of a water-reservoir, an air-compressing chamber connected therewith, and an oil-reservoir connected with the air-chamber and located entirely within the water-reservoir, substantially as described.

2. In a lamp in which the feed of the oil is aided or accomplished by the air-pressure due to a column or body of water, the combination, with the water-reservoir, of an oil-reservoir entirely located therein, a burner and a supply-tube for a burner passing through a part of the water-reservoir, whereby the oil-reservoir is kept cool and the conduction of heat by the burner supply-tube obviated, substantially as described.

In testimony whereof I affix my signature in presence of two witnesses.

WILLIAM P. BUTLER.

Witnesses:
GEORGE S. MARKHAM,
FRANK C. AYRES.